US008874566B2

(12) United States Patent
Robert (10) Patent No.: US 8,874,566 B2
(45) Date of Patent: Oct. 28, 2014

(54) ONLINE CONTENT RANKING SYSTEM BASED ON AUTHENTICITY METRIC VALUES FOR WEB ELEMENTS

(75) Inventor: Arnaud Robert, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 374 days.

(21) Appl. No.: 13/090,101

(22) Filed: Apr. 19, 2011

(65) Prior Publication Data

US 2012/0066203 A1 Mar. 15, 2012

Related U.S. Application Data

(60) Provisional application No. 61/403,125, filed on Sep. 9, 2010.

(51) Int. Cl.
*G06F 17/30* (2006.01)
*G06F 7/00* (2006.01)

(52) U.S. Cl.
CPC .............................. *G06F 17/30864* (2013.01)
USPC ......................................... 707/726; 707/787

(58) Field of Classification Search
CPC .............. G06F 17/30; G06F 17/30941; G06F 17/30991; G06F 17/30651; G06F 17/30696; G06F 17/30861
USPC ....................................................... 707/787
See application file for complete search history.

(56) References Cited

U.S. PATENT DOCUMENTS

| | | | | |
|---|---|---|---|---|
| 5,548,699 A | * | 8/1996 | Ishida et al. | 345/440 |
| 5,857,185 A | * | 1/1999 | Yamaura | 707/999.003 |
| 6,012,053 A | * | 1/2000 | Pant et al. | 707/999.003 |
| 6,182,065 B1 | * | 1/2001 | Yeomans | 707/706 |
| 6,480,837 B1 | | 11/2002 | Dutta | |
| 6,567,812 B1 | * | 5/2003 | Garrecht et al. | 707/708 |
| 6,604,114 B1 | * | 8/2003 | Toong et al. | 707/999.104 |
| 7,966,291 B1 | * | 6/2011 | Petrovic et al. | 707/641 |
| 2005/0060312 A1 | | 3/2005 | Curtiss et al. | |
| 2005/0256866 A1 | | 11/2005 | Lu et al. | |
| 2006/0095416 A1 | | 5/2006 | Barkhin et al. | |
| 2006/0167864 A1 | * | 7/2006 | Bailey et al. | 707/3 |

OTHER PUBLICATIONS

European Search Report issued in EP 11180094.2, mailed Dec. 21, 2011, 7 pages total.

* cited by examiner

*Primary Examiner* — Pavan Mamillapalli
(74) *Attorney, Agent, or Firm* — Kilpatrick Townsend & Stockton LLP (57) ABSTRACT

Methods and systems for identifying and ranking search results and online advertisements based on authenticity are described. A search server includes an authenticity index, which includes authenticity metric values associated with one or more web elements. The authenticity metric values may indicate the relative authority of the web element with respect to a specific category, keyword, search term, phrase, context, filter, etc. Search results may be generated and ranked based on the authenticity metric values.

22 Claims, 6 Drawing Sheets

ONLINE CONTENT RANKING SYSTEM BASED ON AUTHENTICITY METRIC VALUES FOR WEB ELEMENTS

CROSS-REFERENCES TO RELATED APPLICATIONS

This application claims benefit under 35 USC §119(e) of U.S. Provisional Patent Application No. 61/403,125 entitled "Associating Box Code and Content with Consumer ID, and Providing Web Site Authenticity Index," filed Sep. 9, 2010, the entire disclosure of which is incorporated herein by reference for all purposes.

BACKGROUND

Over the past decade, the Internet has grown to a size unmanageable without automated tools. Currently, millions use the Internet to access information, purchase or sell goods and services, communicate with others, etc. However, due to the enormous amount of information available over the Internet, it is not always possible for a user to manually determine exactly where to find information on a particular topic. Likewise, the size of the Internet also makes it difficult for online advertisers to manually determine where to place their advertisements. In order to more easily navigate the Internet, users typically utilize search services. Advertisers, in turn, often provide their advertisements to these search services so that their advertisements can be displayed along with user search results. In doing so, the probability that the advertisers' advertisements are presented to interested users is increased.

In the typical search scenario, a user transmits a search request to a search service. Based on the search request, search results are identified and provided to the user. Many search services perform additional processing to determine the order or ranking of the search results. For example, some search services determine the ranking of search results based on popularity metrics, e.g., site traffic, number of linking sites, etc. and provide ranked/ordered results in response to search requests. As is well-known, Internet content providers will often attempt to influence ranked search results not by providing more compelling content, but by other means. As a result, simply measuring the number of times a web page is visited or using a popularity index might not accurately convey the utility of a web page to the user performing a search. For example, a manipulated page for unauthorized sales of drugs, movies, etc. might be able to obtain a high popularity rating, but what the typical user will want to see is a more authentic page. In many cases, rather than including references to pages where a product can be bought legitimately, search results might return references to pages of disreputable sellers and even references to pages designed to push malware to a user's computer, which may have nothing to do with the desired search.

What is needed in the art are systems and methods that provide high quality search result and other rankings, and that filter for undesirable search and other results.

BRIEF SUMMARY

In embodiments of an online content ranking system, an authenticity index is determined for a set of data, including determining an authenticity metric value based on authenticity indicia, for each of at least a subset of elements in the set of data, and associating the determined authenticity metric value with the corresponding element of the set of data. In some embodiments, the set of data is stored in a database, the authenticity metric value indicates the relative authority of a element with respect to a term, and the authenticity metric value is determined based on explicit and/or implicit authenticity indicia. In specific embodiments, explicit authenticity indicia includes authenticity specific metadata and/or element authenticity characteristics information, and/or non-authenticity specific metadata, trademark information, sponsorship information, domain information, and/or web element characteristics information.

In one implementation, a method for determining an authenticity index for a set of data includes, for each of at least a subset of elements in the set of data, determining an authenticity metric value based on authenticity indicia; and associating the determined authenticity metric value with the corresponding element of the set of data.

In some variations, the set of data is stored in a database. The authenticity metric value indicates the relative authority of a element with respect to a term. An authenticity metric value is determined based on explicit and/or implicit authenticity indicia. Explicit authenticity indicia includes authenticity specific metadata and/or element authenticity characteristics information. Implicit authenticity indicia includes non-authenticity specific metadata, trademark information, sponsorship information, domain information, and/or element characteristics information. At least a subset of elements in the set of data are search results. At least a subset of elements in the set of are advertisements.

In another implementation, a method for ranking elements includes receiving a search request including a search query; identifying a set of elements based on the search request, wherein each element is identified based on its relevance to the search query; ranking the elements to generate a list of ranked elements; associating an authenticity weight to each of at least a subset of the elements based on an authenticity index; processing the list of elements based on the authenticity weights to generate a modified list of ranked elements, and transmitting the modified list to a client device.

In some variations, the authenticity weight of a element indicates the relative authority of an element with respect to the search query. Processing includes re-ranking the list of ranked elements based on the authenticity weights to generate the modified list of ranked elements. Processing includes comparing the authenticity weights with a threshold value to generate the modified list of ranked elements. An element is removed from the list of ranked elements if the authenticity weight associated with the element does not meet the threshold value.

The following detailed description together with the accompanying drawings will provide a better understanding of the nature and advantages of the present invention.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details.

The present disclosure describes methods and systems for identifying and ranking search results and online advertisements based on authenticity. More generally, the teachings herein can be used for programmatically ranking, filtering and/or sorting online properties, objects, content, etc. (generally referred to as "web elements") based on one or more authenticity metrics assigned to each element (or at least some plurality of them). As used herein, a web element can refer to, for example, a web page, a website, an online advertisement, web content, web objects, or any combination thereto storable in electronic form. Some examples described herein may refer to web pages, but it should be understood that the examples are to apply more broadly than to just single pages.

While not a requirement, it is typically the case that the number of web elements are so numerous as to render impractical a manual review of the web elements to determine the authenticity of each.

In a very specific embodiment, a user having a computer or other electronic device with a web browser or browsing interface uses the browser to initiate a search request by sending a search request to a search server. The search server identifies suitable search results to return, ranks the search results based on, at least in part, authenticity metric values, and provides the search results to the user. The search server may additionally identify suitable online advertisements, rank the online advertisements based on, at least in part, authenticity metric values, and provide the online advertisements to the user.

In some embodiments, there is no display on the part of the search server, and it merely replies to the search request with data formatted for the user's web browser. In casual terminology, one might assert that a user goes to a search engine or service, requests a search there, and the search engine or service displays the resulting search. However, it is typically the case that a user-controlled device (computer, mobile telephone, portable device, telephone, etc.) issues a request in some electronic form, a web (or other Internet or network interface-handling) server receives the request and initiates an electronic process that results in some search results that match the request (or are deemed to match the request, or approximately match the request, even if they do not strictly match the request), and the search server sends a message back to the user-controlled device (or its network interface) such that the reply message contains, or can be said to contain, the search results.

In certain embodiments, an advertising server can additionally listen for advertising requests from systems and/or servers that provide web elements (into which the advertising might be integrated) and in response to a request, determine at least one authenticity metric for the web element (or the site or the operator that will provide the web element) and provide different online advertisements for different authenticity metrics.

Search results might be in the form of a set of uniform resource locators (URLs), references to web elements, and/or the like. A reference to a web element may include, for example, a brief description of the web element (e.g., a preview of a web page's text, a web page's title, etc.) and a URL linking to the web server from which the web element may be retrieved.

In some embodiments, a web element might comprise one or more of text-based content, a static image (e.g., a JPEG image), an animated image (e.g., an animated GIF), an Adobe Flash™ based program, a Java based program, a Microsoft Silverlight™ based program, a piece of audiovisual media, a piece of audio-only media, an interactive computer program, and/or the like. Web elements for advertising (e.g., online advertisements) might be of the same form as, or a different form from, the content that the advertising is associated with.

As noted, online advertisements may refer to web element(s) used for advertising goods and/or services. In some embodiments, an online advertisement may be associated with other web elements. For example, an online advertisement may be text-based and include a hyperlink to a web page of a website advertising a special-offer to purchase a Blu-ray™ movie.

The term "website" is often used to refer to a server (or coherent collection of servers) accessible over a network and the content it serves, reflecting the user experience of "going:" to a virtual place (site) when the user causes a client device to retrieve and display some or all of that content. Therefore, it should be understood that "website" might be shorthand for a collection of network interfaced hardware and content stored or accessible thereon. Typically, but not always, the content and hardware of a website are perceived by viewers as being integrated and under control of a unitary entity, at least in part.

For example, where a server serves information about a specific company (products, contact info, hours of operation, etc.) with the content or organized with a consistent feel to various pages of that content, the servers and content are referred to as that company's website, even if the hardware is someone else's and some of that content is obtained from outside the company.

The ranking of search results and online advertisement placement, and other such tasks may be based on an authenticity index comprising authenticity metric values (e.g., weights, scores, etc.) for a large number of web elements. The authenticity index is typically stored in an electronic storage or computer-readable medium, but might be in a more distributed, logical form. An authenticity metric value may indicate the relative authority of a web element with respect to a specific category, keyword, search term, phrase, context, filter, and any combination thereof. For example, a web page accessible from Disney.go.com may be considered authoritative with regard to a search term for tickets to Disneyland™ or a history of the Mickey Mouse™ character relative to a web page for a site that sells tractor parts, but then the tractor parts web page might be more authoritative as to tractors. As a result, one web page may be associated with a high authenticity metric value with respect to one search term, but not another. There may be some sites (e.g., <dishorable-malware-downloader-posing-as-a-freebie-site>.com) that might be of low authoritativeness for all categories and can be associated with a low authenticity metric with respect to the search term (or non-searched terms).

In some embodiments, the determination of the authenticity values may be achieved in any suitable manner. For example, authenticity values may be determined based on a set of explicit authentic data, e.g. authenticity metadata, specific web element authenticity characteristics, trademarks, copyrighted material, or web or online sources that authoritative sources curate. Authenticity values may also be determined based on a set of implicit data, e.g. authenticity indicia such as metadata not specific to authenticity, trademark-related information, copyright-related information, sponsorship information, domain information, web element characteristics, references from authoritative sources, references to authoritative sources. Of course, authenticity values may also be determined on both explicit and implicit authenticity data.

In some embodiments, the determination of the authenticity metric may be achieved in any suitable manner using the authenticity data. As an example, authenticity metric values may be determined based on the results of the execution of a fuzzy logic algorithm which associates different weights to multiple authenticity data values based on usage by consumers, third party reviews, and optimization algorithms. As another example, authenticity metric values may be determined using a neural network; illustratively, a neural network may be trained to determine authenticity based on an initial set of web element data and following training, the neural network may be used to automatically assign authenticity weights to web elements. As yet another example, authenticity metric values may be determined by people associating weights to available authenticity data, either transparent to the consumer, or by consumers themselves. As yet another example, authenticity metric values may be determined by regulatory or advisory consortia whom have credentials in the related areas for which authenticity metrics are being derived.

In some embodiments, the determination of the authenticity data values, or the authenticity metric, is continuously adapted to take into account new information, new algorithms, new curation methods, changes in the validity of sources used to determine such authenticity data values, consumer feedback and/or new information that did not exist before.

As discussed, embodiments described herein enable search results and/or online advertisements to be ranked and filtered based on authenticity. In particular, embodiments enable more authoritative search results and online advertisements to be ranked higher and be more visible to a user. Embodiments furthermore enable the filtering of undesirable search results, such as results referencing piracy websites, child pornography websites, and/or the like.

Examples of the concepts and disclosures provided above will now be further explained with reference to the figures.

Figure 1:
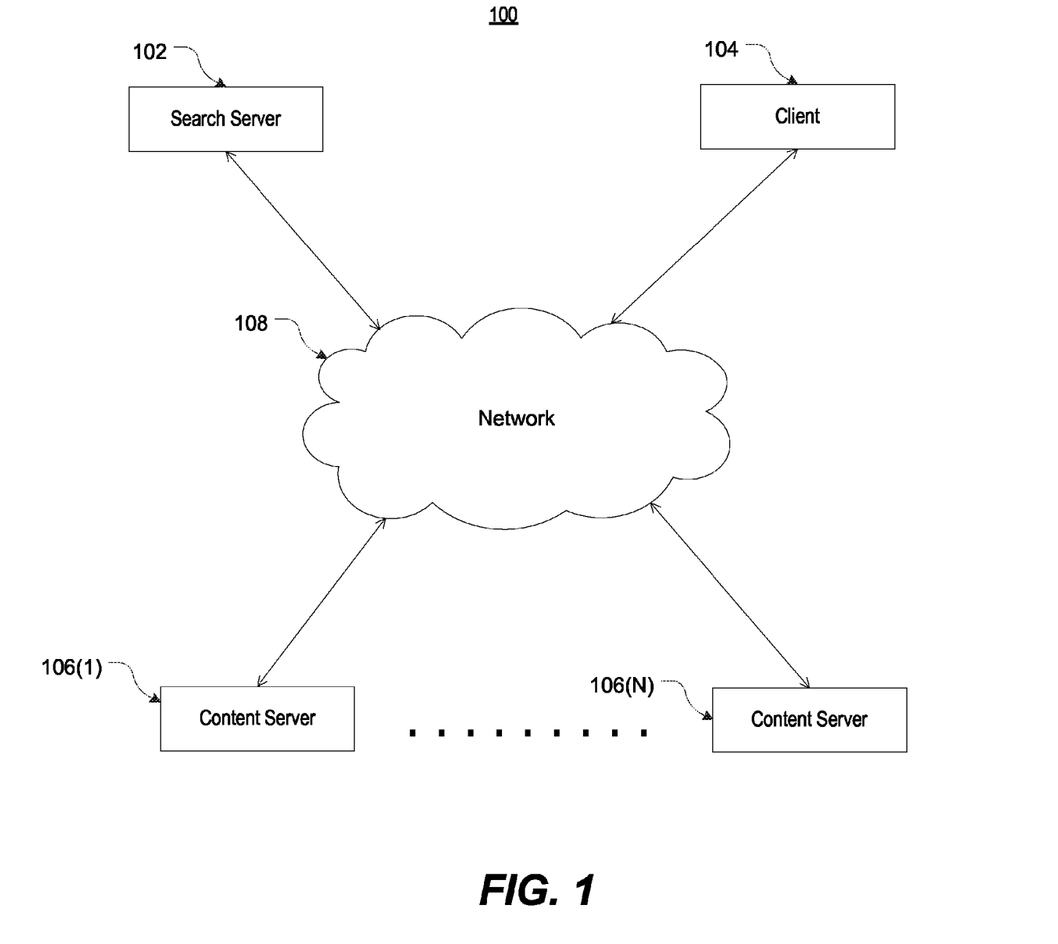
FIG. 1 is a block diagram of a search system according to one embodiment.

FIG. 1 illustrates a block diagram of an exemplary search system 100 according to one embodiment. Search system 100 includes a search server 102, a client device 104, and one or more content server(s) 106(1)-106(N). While only one search server 102 and one client device 104 are shown, search system 100 can include any number of search servers and client devices.

In search system 100, search server 102, client device 104, and content server(s) 106(1)-106(N) are in operative communication with one another through network 108. Client device 104 is configured to communicate with search server 102 and to receive a list of search results referencing and/or a list of online advertisements associated with one or more web elements stored on content server(s) 106(1)-106(N). Based on the search results, client device 104 can access any of content server(s) 106(1)-106(N) to retrieve web pages and other content. In some embodiments, client device 104 may access content server(s) 106(1)-106(N) by following hyperlinks, etc.

Search server 102 may be implemented as one or more computer systems. For example, search server 102 may be a large mainframe, a minicomputer cluster, or a group of servers functioning as a unit. In some embodiments, search server 102 may include a computer-readable medium (CRM) and a processor (e.g., a processor manufactured by Intel, AMD, ARM, etc.) coupled to the CRM. In certain embodiments, search server 102 may be an Internet-connected server responsive to requests (e.g., search requests) at a URL designated by the operator of the search server. Search server 102 may be associated with or may be a part of a search service such as Google's search service, Microsoft Bing™ search, etc.

In some embodiments, search server 102 may be configured to generate and reference one or more search indexes that index various web elements. In certain embodiments, search server 102 may implement one or more content collection technologies (e.g., spidering programs, such as a web crawlers, spider scripts, etc.) to generate the one or more search indexes. In other embodiments, an external server (not shown) may generate the one or more search indexes and provide the indexes to search server 102. In some embodiments, the one or more search indexes may be periodically or continuously updated. For example, a spidering program may periodically crawl network 108 in order to locate and identify new or updated web elements.

Search server 102 may additionally include an online advertisement inventory. The inventory may store a set of online advertisement received from various sources, such as an advertiser's server.

In some embodiments, search server 102 may generate an authenticity index. The authenticity index may include authenticity weights or other authenticity-based metric values for the web elements indexed in the one or more search indexes. The authenticity index may additionally or alternatively include authenticity weights or other authenticity-based metrics for online advertisements stored in the online advertisement inventory. Search server 102 may determine an authenticity weight in any suitable manner. In some embodiments, search server 102 may assign authenticity weights using authenticity indicia.

In certain embodiments, an authenticity weight may indicate the relative authority of a web element for a given category, context, keyword, phrase, search term, filter, etc. For example, a search index may index a Disney.go.com™ web page for the Snow White and the Seven Dwarfs™ film and an online encyclopedia web page that also discusses the same film. The Disney.go.com web page may be associated with an authenticity weight that is greater than the authenticity weight associated with the encyclopedia web page because Disney.go.com is the official domain for The Walt Disney Company. As such, with respect to the Snow White and the Seven Dwarfs™ film, the Disney.go.com web page may be considered more authoritative (and thus more authentic) than the encyclopedia web page.

In some embodiments, search server 102 may further be configured to receive search requests and transmit search results and/or online advertisements to client device 104.

For example, client device 104 may transmit a search request to search server 102, which may include a search query (e.g., keywords, search terms, etc.). In response to the search request, search server 102 may generate a list of search results based on the request and on one or more search indexes. The search server 102 may additionally or alternatively generate a list of online advertisements based on the request and on an online advertisement inventory. The search results and/or online advertisements may be ranked (e.g., listed in an ordered manner) based on any suitable criteria, rules, parameters, and/or algorithms e.g., relatedness or logical relevance to the information included in the search request, number of times the web element to which a search result references or with which an online advertisement is associated is referenced by other web elements, context of a search result or online advertisement, sponsorship value associated with a search result or online advertisement, etc.

In some embodiments, search server 102 may additionally rank the search results and/or online advertisements based on authenticity. In particular, search server 102 may use the authenticity weights stored in authenticity index to determine the rankings of the search results and/or online advertisements.

In some embodiments, search server 102 may exclude certain search results and/or online advertisements associated with authenticity weights that do not meet a predefined authenticity weight threshold. For example, an online advertisement associated with a web page selling pirated copies of motion picture films may be associated with a very low authenticity weight. As a result, the online advertisement may be altogether excluded from a set of online advertisements.

Client device 104 may be any suitable device for accessing a network, such as the Internet. Client device 104 may be, for example, a desktop computer, a laptop computer, a tablet device, a mobile phone, a personal digital assistant (PDA), a gaming device, a multimedia device, a handheld device, a multi-function device, a television, a digital video recorder (DVR), a multimedia streaming device, and/or the like. Client device 104 may include a computer readable memory (CRM), and a processor coupled to the CRM. The processor may be a central processing unit, such as a processor manufactured by Intel, AMD, ARM, etc. Client device 104 may additionally include standard computer components such as a disk drive, CD ROM drive, display (e.g., CRT or LCD monitor), display adapter, network card, wireless card, input device (e.g., a mouse, a keyboard, a touch screen LCD), and other components, subsystems, and devices. In some embodiments, the processor of client device 104 may be configured to execute a web browser.

Content server(s) 106(1)-106(N) may be implemented as, for example, one or more computer systems. For instance, a single content server may be a large mainframe, a minicomputer cluster, or a group of servers functioning as a unit. In some embodiments, a content server may include a computer-readable medium (CRM) and a processor coupled to the CRM. In some embodiments, a content server may be an Internet-connected server responsive to requests at a URL designated by the operator of the content server. A content server may further store web pages and other content. In certain embodiments, a content server may include a web server application. The web server application may be an application program configured to receive web page requests from client devices and to transmit web pages in response to the web page requests. The web server application may be any suitable software that implements the HTTP protocol, such as a Microsoft IIS™ server, an Apache Web Server™, an Oracle iPlanet™ system, etc.

In various embodiments, network 108 may include, among other possibilities, the Internet, a wide area network, a local area network, a virtual private network (VPN), or the like. In some embodiments, client device 104 may access network 108 through any of various wired or wireless network adaptors, such as a modem, Ethernet device, and/or hardware using one or more of CDMA, GSM, WiFi, IR, 4G, satellite link, cellular data network adaptors, and/or the like. For simplicity within the present disclosure, the example for network 108 may be the Internet, but it should be understood that it is used interchangeably with other networks in the following discussion.

In the present embodiment, search system 100 may further include software that enables communications between the various entities shown in FIG. 1. For example, communications between the entities may be facilitated by the HTTP, SSL, TLS, TCP/IP, RTP/RTSP protocols, and/or the like.

Figure 2:
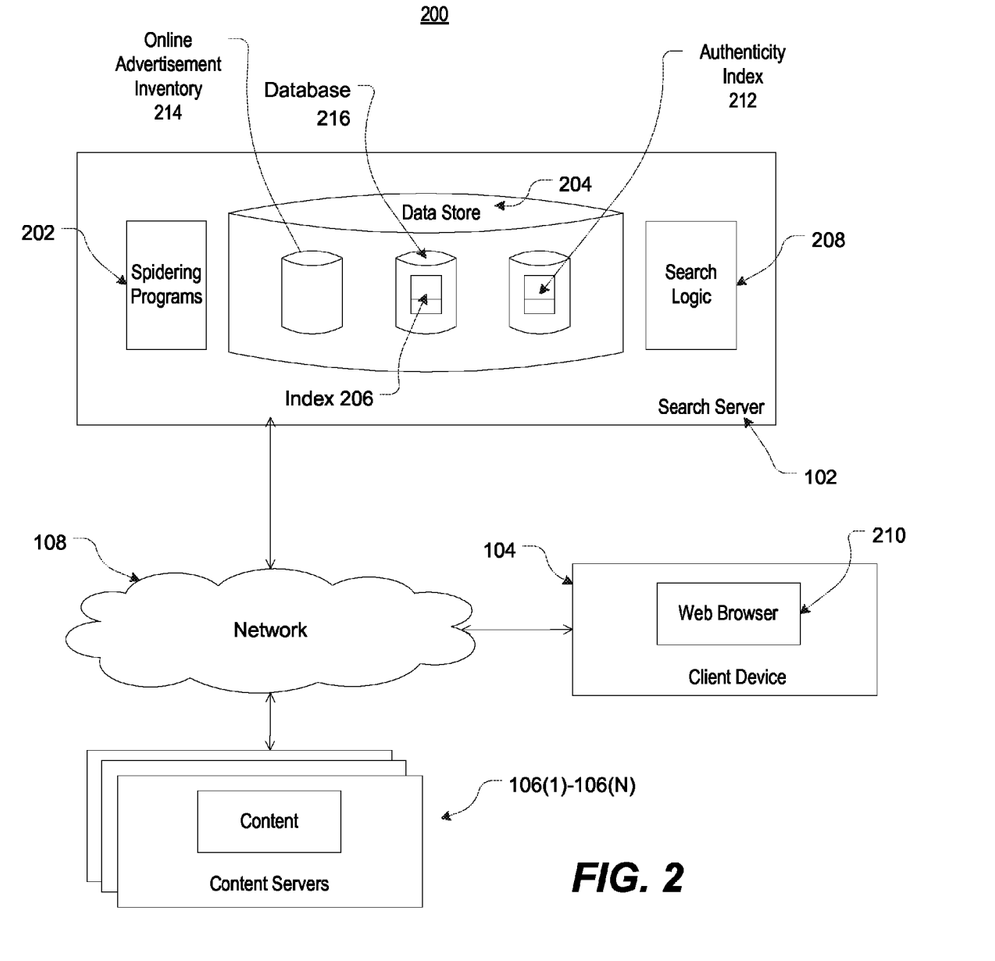
FIG. 2 is a block diagram of a subsystem of the search system shown in FIG. 1 according to one embodiment.

FIG. 2 illustrates a block diagram of an exemplary subsystem 200 of the search system 100 of FIG. 1 according to one embodiment. FIG. 2 illustrates additional details regarding the search server 102 and client device 104.

In certain embodiments, search server 102 may include one or more spidering programs 202, a data store 204, and a search logic 208.

The one or more spidering programs 202 may be software application programs that crawl across network 108 gathering data. For example, spidering programs 202 may identify web elements and collect data associated with the web elements from the one or more content server(s) 106(1)-106(N). In some embodiments, spidering programs 202 may gather data across the network 108 automatically or semi-automatically. Spidering programs 202 may be, for example, spider scripts, web crawlers, etc.

Data store 204 may be implemented as data stored in one or more electronic storage units (e.g., stand alone hard drives) capable of storing electronic data. In some embodiments, data store 204 may include a search database 216, an authenticity index 212, and an online advertisement inventory 214. In some embodiments, search database 216 may store the data associated with the web elements identified by spidering programs 202. Search database 216 may additionally include a search index 206. Search index 206 may include a data structure indexing the web elements identified by the one or more spidering programs 202. In some embodiments, each indexed web element may be linked with its associated data stored in search database 216. Search index 206 may be used by search logic 208 in order to perform, for example, search related processing. In some embodiments, online advertisement inventory 214 may store one or more online advertisements. The online advertisements may be received from one or more advertising agency servers and/or advertiser's servers. In some embodiments, online advertisement inventory 214 may be a database system.

Data store 204 may additionally include an authenticity index 212. Authenticity index 212 may include a data structure containing authenticity information, including authenticity weights, associated with the web elements indexed in search index 206 and/or stored in online advertisement inventory 214. For example, authenticity index 212 may include a structure that enables the association of terms with the URLs of various web elements and with corresponding authenticity weights. Illustratively, authenticity index 212 may include a record associating the term iPod with the URL: "www.apple.com/ipod" and an authenticity weight of 1.

Search logic 208 may be an application program configured to execute various algorithms for identifying and ranking search results and/or online advertisements. In some embodiments, search logic 208 may determine the relative authenticity of web elements indexed in search index 206. Search logic 208 may additionally determine the relative authenticity of online advertisements stored in online advertisement inventory 214. Search logic 208 may store authenticity information in authenticity index 212. Search logic 208 may, furthermore, receive search requests from client device 104. In response to the search request, search logic 208 may determine a set of relevant search results and/or online advertisements. The search results and/or online advertisements may be ranked according to a set of criteria, rules, parameters, and/or algorithms. In some embodiments, search logic 208 may additionally rank search results and/or online advertisements based on authenticity index 212. Search logic 208 may further transmit the search results and/or online advertisements to client device 104, which presents the results and/or advertisements in a web browser executed on client device 104. In some embodiments, search results and online advertisements may be presented in lists. Search results and online advertisements with higher rankings may be positioned higher on the lists.

Client device 104, as described herein, might execute a web browser, such as the web browser 210. Web browser 210 may be configured to generate and transmit web page requests. Web browser 210 may additionally be configured to render web pages. For example, web browser 210 may be configured to render web pages coded in HTML, extensible markup language (XML), JavaScript, etc. so that it is viewable by a user of client device 104. Web browser 210 may additionally include plug-ins to render certain types of web elements. Web browser 210 may be, for example, any suitable browser such as the Microsoft Internet Explorer™ browser, the Mozilla Firefox™ browser, the Google Chrome™ browser, the Apple Safari™ browser, the Opera™ browser, etc.

The various entities shown in FIGS. 1 and 2 may be combined or configured in any suitable manner. For example, search index 206 and authenticity index 212 may be integrated into the same data structure. As another example, authenticity index 212 may be stored externally from data store 204.

Figure 3:
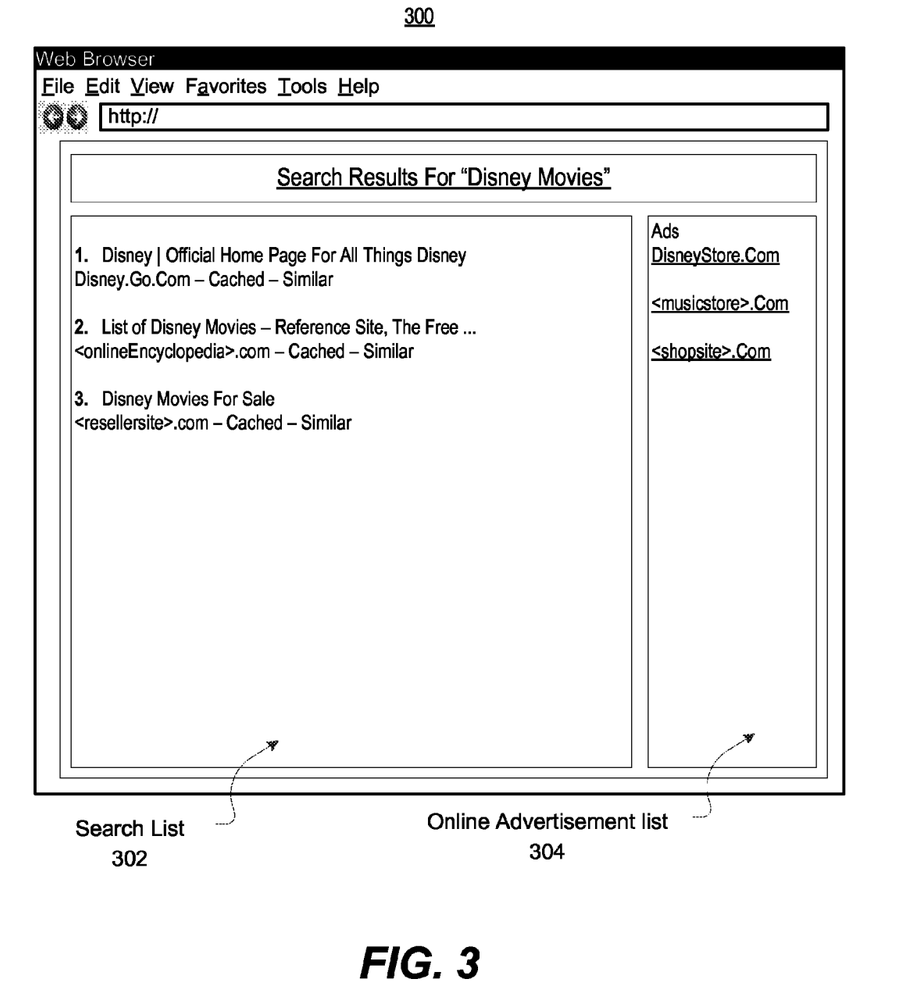
FIG. 3 is an exemplary web page showing ranked search results and online advertisements according to one embodiment.

FIG. 3 illustrates an exemplary web page 300 including a set of search results and a set of online advertisements. The web page 300 may be presented to a user via web browser 210 executed on client device 104. The set of search results and set of online advertisements may be provided to client device 104 by search logic 208 in response to a search request. As shown in FIG. 3, the set of search results are ranked in list 302. More specifically, the search results determined to be of higher rank are positioned higher on list 302. Illustratively, a Disney.go.com web page is shown as ranked higher (and thus positioned higher) than an <onlineEncyclopedia>.com web page for the "Disney Movies" search query. In some embodiments, the ranking of search results may be based on the relative authenticity of the search results as specified by authenticity index 212. As also shown in FIG. 3, the set of online advertisements are ranked in list 304. More specifically, the online advertisements determined to be of higher rank are positioned higher on list 304. The ranking of the online advertisements may be based on the relative authenticity of the online advertisements as specified by authenticity index 212.

Examples of processes that may be used to identify and rank search results and online advertisements based on authenticity will now be described.

Figure 4:
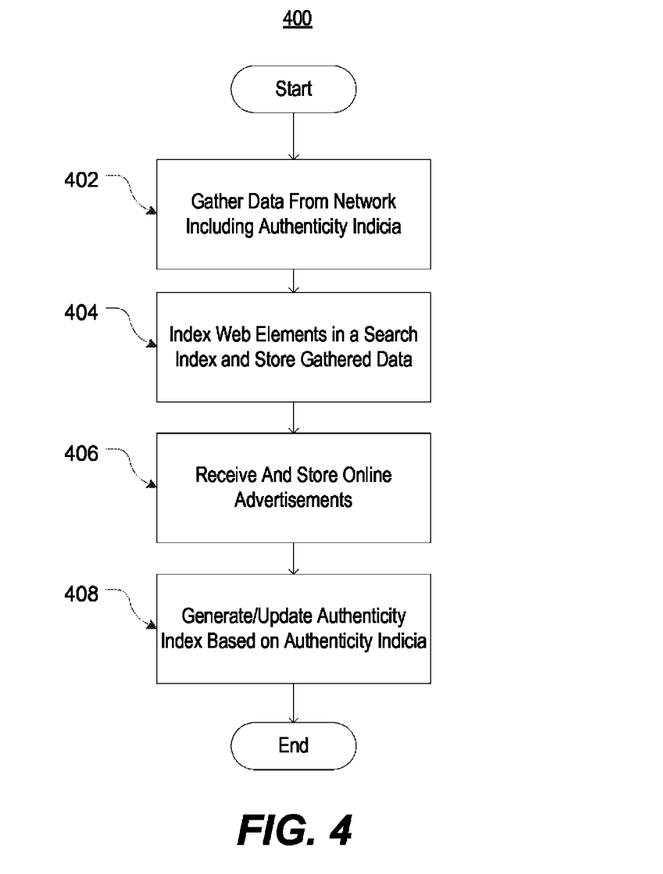
FIG. 4 is a flow diagram of a process for generating an authenticity index according to one embodiment.

FIG. 4 is a flow diagram of a process 400 for determining the authenticity of web elements according to one embodiment. Process 400 may be performed by e.g., search server 102 of FIG. 1.

At step 402, search server 102 gathers data from network 108. In particular, search server 102 may execute one or more spidering programs 202. The spidering programs may be configured to identify and collect data for web elements from the content server(s) 106(1)-106(N) connected to network 108. For instance, a spidering program 102 may collect information by accessing registered websites (e.g., websites registered with the search service associated with search server 102), following hyperlinks embedded in the web pages of registered websites, etc.

In some embodiments, the one or more spidering programs 102 may collect, for example, the content (e.g., text, images, etc.), title tag data, links, keywords, URL information, metadata, and/or other data for a web element. In certain embodiments, the one or more spidering programs 102 may additionally collect authenticity indicia. For example, the one or more spidering programs 102 may collect explicit authenticity indicia and/or implicit authenticity indicia. Authenticity indicia may, in addition, be provided by an operator of search server 102 or received from other sources, such as the servers of trusted partners of the operators of search server 102. The authenticity indicia may enable search logic 208 of search server 102 to determine the relative authenticity or authority of a particular web element.

At step 404, search server 102 indexes the identified web elements in search index 206. Collected data associated with the web elements are stored in search database 216 as, for example, database records. Illustratively, search server 102 may store the content (e.g., text, images, etc.), title tag data, links, keywords, URL information, metadata, and/or other data of a web element in a database record.

In some embodiments, search index 206 may be structured in a manner to enable the accurate, efficient, and rapid retrieval of information. Illustratively, a search query may include the search term "Disney." The search index may be structured in a manner to permit, for example, search server 102 to quickly identify those database records that include the term "Disney." The structure of search index 206 may be based on any suitable combination of computer science, mathematical, language-based, etc. structures and concepts. For example, search index 206 may be structured as a suffix tree, an inverted tree, a citation index, an n-gram index, or a document-term matrix.

In some embodiments, search index 206 may be continually or periodically updated (e.g., new pages added, deleted pages removed, changed pages updated, etc.). For example, the one or more spidering programs 202 may monitor a particular web page or search for new web pages over network 108 on a periodic basis, and update search index 206 accordingly.

At step 406, search server 102 receives online advertisements from a suitable source. For example, search server 102 may receive online advertisements from an advertiser's server, an advertising agency server, and/or the like. In some embodiments, search server 102 stores the online advertisements in online advertisement inventory 214.

At step 408, search logic 208 of search server 102 generates or updates authenticity index 212. In some embodiments, authenticity index 212 may include authenticity weights for the web elements indexed in search index 206 and/or stored in online advertisement inventory 214. Authenticity weights may be based on any suitable numeric or alphanumeric scale. For example, an authenticity weight may be a number within the range of 0-1. In some embodiments, the higher the weight, the greater a web element's authenticity. Illustratively, a weight of 0.5 may be considered more authentic than a weight of 0.35. In other embodiments, the lower the weight, the greater a web element's authenticity.

An authenticity weight may indicate the relative authority of a particular web element in relation to a particular category, context, keyword, search term, phrase, filter, etc. For example, a Disney.go.com web page and an online independent movie reviewing site may both include the phrase "Toy Story 3™." With respect to the phrase Toy Story 3™, the Disney.go.com web page may be associated with an authenticity weight of 1. The other web page may, in contrast, be associated with an authenticity weight of 0.8. Because the Disney.go.com web page is associated with a higher authenticity weight than the other web page, it may be considered more authoritative.

Search logic 208 may assign authenticity weights to web elements indexed in search index 206 and/or online advertisements stored in online advertisement inventory 214 based on authenticity indicia. In some embodiments, an authenticity weight for an online advertisement may be based on, in part, authenticity indicia for the web element to which the online advertisement is associated.

As one example, a web page may include a metadata tag indicating the Disney™ trademark. Because the web page includes the Disney™ trademark, the web page may be assigned a relatively high authenticity weight with respect to Disney related terms e.g., Disneyland™, Walt Disney, Tangled™, etc.

As another example, an online advertisement may be associated with a web page accessible from the Disney.go.com™ domain. Because the domain is a known official domain for The Walt Disney Company, the online advertisement may be assigned a relatively high authenticity weight with respect to Disney related terms.

As yet another example, a web page may be associated with a website, which may be associated with certain characteristics. For example, a web page discussing a certain pharmaceutical drug may be a part of the WebMD website. Because the WebMD website is known to include content written by medical professionals, the web page may be assigned a relatively high authenticity weight with respect to the pharmaceutical drug. By contrast, another web page discussing the same pharmaceutical drug may be part of an online encyclopedia website. Because the operators of the online encyclopedia website may not similarly limit its content to medical professionals, the web page may be assigned an authenticity weight that is lower than the WebMD web page with respect to the pharmaceutical drug. With respect to online advertisements, authenticity weights may be assigned based on the authenticity indicia for the web elements (e.g., web page, website) with which the online advertisement is associated. For example, an online advertisement associated with Apple.com may be assigned a high authenticity with respect to iPhone™ related search terms based on authenticity indicia for Apple.com.

In some embodiments, search logic 208 may assign an authenticity weight to a web element based on its proximity to a set of core or seed web pages. In the case of an online advertisement, an authenticity weight may be assigned based on the proximity of the online advertisement's associated web element to the set of core or seed web pages. For example, if an online advertisement is associated with <electronicsretailer>.com, the authenticity of the online advertisement may be based on the proximity of <electronicsretailer>.com to a seed web page.

A seed web page may be, for example, a web page that is associated with a pre-assigned authenticity weight. In some embodiments, the weight for a seed web page may be manually pre-assigned based on input, for example, from an operator of the search server 102. In certain embodiments, the weight may be assigned, for example, using authenticity indicia as described above e.g., weight assignment based on web element trademark metadata, web element characteristics information, etc.

In some embodiments, the proximity of a web element to a seed web page may be defined by the number of links or hops required to reach the web element from the seed web page. Illustratively, a Disney.go.com web page for the Toy Story 3™ movie may be a seed web page and may be pre-assigned with an authenticity weight of 1. The web page may include links to other web pages, such as web pages on a music site and a social network site. These pages may be assigned a slightly lower authenticity weight, such as 0.9. The web pages on the music and social network sites may, in turn, link to other web pages. These web pages may be assigned even lower authenticity weights, such as 0.8 because they are further in proximity (i.e., they require two hops) from the Disney.go.com web page. In some embodiments, those web pages that are not directly linked to a core or seed web page may receive relatively low authenticity weights.

Figure 5:
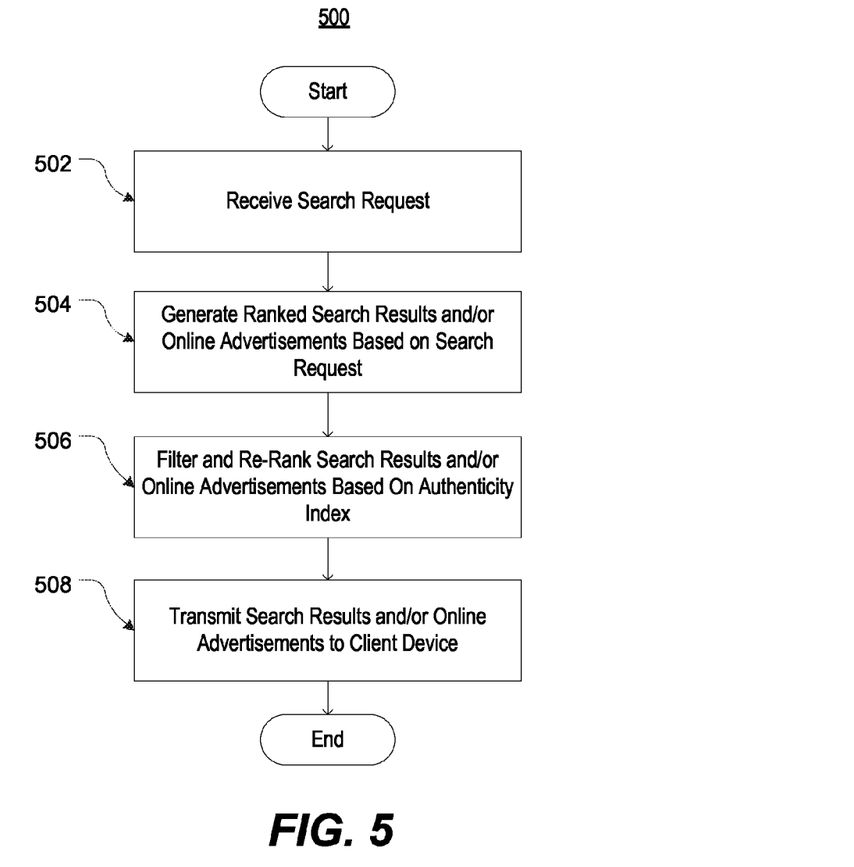
FIG. 5 is a flow diagram of a process for ranking search results and online advertisements based on an authenticity index according to one embodiment.

FIG. 5 is a flow diagram of a process 500 for identifying and ranking search results and online advertisements based on authenticity according to one embodiment. Process 500 may be performed by e.g., search server 102 of FIG. 1.

At step 502, search server 102 receives a search request from client device 104. In particular, a user operating client device 104 may access a search tool for search server 102. The search tool may be presented by web browser 210 to the user of on client device 104. The tool may be presented as, for example, a web page including a text field for entering keywords, phrases, search terms, contexts, filters, and/or the like. The web page may additionally include other search related options, such as data ranges, domains to be searched, and/or the like. Using the search tool, the user of client device 104 may initiate a search request, which is received by search server 102.

At step 504, search logic 208 of search server 102 processes the search request and generates a set of ranked search results. In particular, based on the information provided in the search request, search logic 208 may identify and generate a set of search results based on the data included in search index 206.

In some embodiments, the results may be identified based on any suitable criteria, rules, parameters and/or algorithms. For example, a result may be identified based on the number of times a search term appears in a web element associated with the result, the relevance of a web element associated with the result with respect to a provided search term, etc.

In certain embodiments, the search results may be ranked using any suitable criteria, rules, parameters and/or algorithms. For example, search results associated with more relevant web elements or web elements with higher PageRank™ scores, may be ranked higher.

In some embodiments, search logic 208 may additionally identify a set of online advertisements stored in online advertisement inventory 214. Online advertisements may be identified based on any suitable criteria, rules, parameters and/or algorithms. For example, an online advertisement may be identified based on the number of times a search term appears in the online advertisement or the web element with which the online advertisement is associated, the relevance of the online advertisement or the web element with which an online advertisement is associated with respect to a provided search term, etc.

In certain embodiments, the online advertisements may be additionally ranked using any suitable criteria, rules, parameters, and/or algorithms. For example, online advertisements may be ranked based on the sponsorship value associated with each advertisement, relevance of each advertisement to a search term, the PageRank™ scores for the web elements associated with the online advertisement, etc.

At step 506, search logic 208 filters and/or re-ranks the generated search results and/or online advertisements based on authenticity index 212. For example, search server 102 may receive a search request for information regarding a particular pharmaceutical drug. Based on search index 206, search logic 208 may generate search results including references to a WebMD web page and an online encyclopedia web page discussing the drug. The search result for the online encyclopedia web page may initially be ranked higher than the search result for the WebMD web page because the online encyclopedia web page has a higher, for example, PageRank™ score (e.g., the online encyclopedia web page is referenced by more web pages than the WebMD web page). However, search logic 208 may use authenticity index 212 to determine that the content on WebMD is more authoritative with respect to the drug because it contains a higher authenticity weight. As such, search logic 208 may re-rank the search result referencing the WebMD web page to be positioned above the search result referencing the online encyclopedia web page. In some embodiments, search logic 208 may remove search results and/or online advertisements that do not meet a threshold authenticity weight. For example, an online advertisement associated with a web page selling pirated copies of DVD movies may be associated with a low authenticity weight. As such, search logic 208 may filter or remove the online advertisement.

In some embodiments, the authenticity of a web page may not necessarily cause a search result associated with the web page to be ranked higher than the search result for another web page. For example, a first web page may be associated with an authenticity weight of 100. A second web page may be associated with an authenticity weight of 90. The second web page, however, may be determined to be much more relevant to a particular search query than the first web page. As such, the search result for the second web page may be ranked ahead of the search result for the first web page.

In some embodiments, steps 504 and 506 may be combined. In particular, search logic 208 may use authenticity weight as a parameter in the initial generation and ranking of search results and/or identification and ranking of online advertisements. For example, search logic 208 may consider search term relevance, context, PageRank™ score, and authenticity weight in generating ranked search results and/or online advertisements. Illustratively, search logic 208 may compute or identify a score for each of the aforementioned parameters. Thereafter search logic 208 may compute a single combined score that can be used for ranking Search logic 208 may use any suitable algorithm or weighting scheme in computing the combined score.

At step 508, search server 102 provides the ranked search results and/or online advertisements to client device 104. Search server 102 may provide the search results and/or online advertisements in any suitable manner. For example, search results and online advertisements may be embedded in a web page coded in HTML, etc. Upon receiving a web page containing the search results and/or online advertisements, web browser 210 of client device 104 may render the web page so that the page is viewable by a user. The search results and/or online advertisements may include links to web pages, previews of the web pages (e.g., portions of the text on a web page), advertisement text, and/or the like.

Although specific embodiments of the invention have been described, various modifications, alterations, alternative constructions, and equivalents are also encompassed within the scope of the invention. For example, the described invention is not restricted to operation with certain types of advertiser, advertising agency, web and advertising platform servers, but is free to operate with a plurality of different advertiser, advertising agency, web and/or advertising platform servers. Additionally, although the present invention has been described using a particular series of transactions and steps, it should be apparent to those skilled in the art that the scope of the present invention is not limited to the described series of transactions and steps. For example, where an element is shown as hardware performing particular actions, it might be replaced with a general purpose processor executing program instructors stored as software with the instructions corresponding to similar actions. The storage can be a computer-readable medium.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Any of the elements in FIGS. 1 and 2, including any servers or databases, may use any suitable number of subsystems to facilitate the functions described herein. Software that includes the functionality of steps, operations or elements described herein might be stored on a computer readable medium, such as a hard disk, thumb drive, CD-ROM, DVD-ROM, DVD, or other computer-readable medium that is in tangible form.

Figure 6:
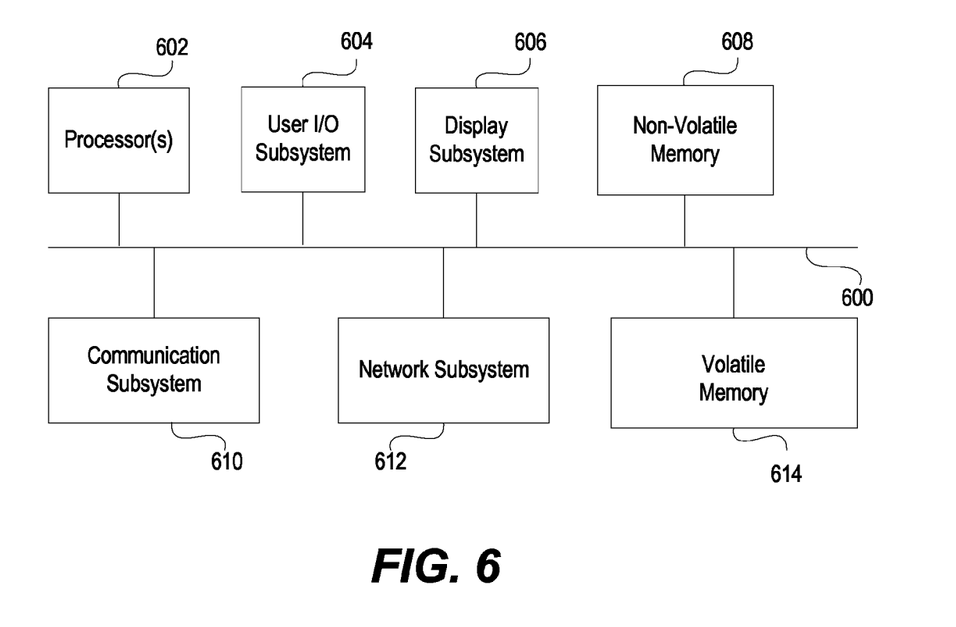
FIG. 6 is a block diagram of exemplary subsystems or components according to one embodiment.

Examples of such subsystems or components are shown in FIG. 6. The subsystems shown in FIG. 6 are interconnected via a system bus 600. Additional subsystems such as a processor 602, user I/O subsystem 604, display subsystem 606, non-volatile memory 608, communication subsystem 610, network subsystem 612, volatile memory 614, and others are shown. Peripherals and input/output (I/O) devices, which couple to user I/O subsystem 604 (which may be a processor or other suitable controller), may be connected to the computer system by any number of means known in the art, such as a USB port. Communication subsystem 610 or network subsystem 612 may be used to connect the computer system to a wide area network such as the Internet, a networked element, a mouse input device, a scanner device, a printing device, and/or the like. The interconnection via system bus allows processor 602 to communicate with each subsystem and to control the execution of instructions from non-volatile memory 608 or volatile memory 614, as well as the exchange of information between subsystems. Non-volatile memory 608 and/or volatile memory 614 may embody a computer readable medium.

What is claimed is:

1. A method for determining at least one authenticity metric value for a set of data, comprising:
   retrieving, by a computer system, the set of data from one or more computer servers, wherein the set of data includes data for a plurality of web elements;
   for each of at least a subset of elements in the set of data, determining an authenticity metric value, wherein the authenticity metric value of a web element is assigned based on a number of links required to reach the web element from a seed web page having a pre-assigned authenticity weight, wherein the pre-assigned authenticity weight is assigned based on at least one of a previously determined authenticity metric value associated with the seed web page and a user-determined authenticity weight; and
   associating the determined authenticity metric value with the corresponding element of the set of data.

2. The method of claim 1, wherein the set of data is stored in a database.

3. The method of claim 1, wherein the authenticity metric value indicates the relative authority of an element with respect to a term.

4. The method of claim 1, wherein the authenticity metric value is determined based on at least one of explicit or implicit authenticity indicia.

5. The method of claim 4, wherein explicit authenticity indicia includes at least one of authenticity specific metadata or element authenticity characteristics information.

6. The method of claim 4, wherein implicit authenticity indicia includes at least one of non-authenticity specific metadata, trademark information, sponsorship information, domain information, or element characteristics information.

7. The method of claim 1 wherein at least a subset of elements in the set of data are search results.

8. The method of claim 1 wherein at least a subset of elements in the set of are advertisements.

9. A computer-readable storage medium containing program instructions that, when executed by a computer system, cause the computer system to execute a method for determining at least one authenticity metric value, comprising:
   retrieving data from the one or more computer servers, wherein the data includes data for a plurality of web elements;
   indexing the plurality of web elements in a search index; and
   generating an authenticity index, wherein the authenticity index includes an authenticity metric value associated with each of at least a subset of the plurality of web elements, wherein the authenticity metric value is assigned based on the number of links required to reach a web element from a seed web page having a pre-assigned authenticity weight wherein the pre-assigned authenticity weight is assigned based on at least one of a previously determined authenticity metric value associated with the seed web page and a user-determined authenticity weight.

10. The computer-readable storage medium of claim 9, wherein the authenticity metric value indicates the relative authority of a web element with respect to a search term.

11. The computer-readable storage medium of claim 9 wherein the authenticity metric value is determined based on data derived from a neural network.

12. The computer-readable storage medium of claim 9, wherein the authenticity metric value is determined based on a fuzzy logic algorithm.

13. A method for ranking elements, the method comprising:
   receiving a search request including a search query;
   identifying a set of elements based on the search request, wherein each element is identified based on its relevance to the search query;
   ranking the elements to generate a list of ranked elements;
   associating an authenticity weight to each of at least a subset of the elements, wherein the authenticity weight is assigned based at least in part on the number of links required to reach a web element from a seed web page having a pre-assigned authenticity weight, wherein the pre-assigned authenticity weight is assigned based on at least one of a previously determined authenticity metric value associated with the seed web page and a user-determined authenticity weight;
   processing the list of elements based on the authenticity weights to generate a modified list of ranked elements, and
   transmitting the modified list to a client device.

14. The method of claim 13 wherein the authenticity weight of an element indicates the relative authority of the element with respect to the search query.

15. The method of claim 13 wherein processing includes re-ranking the list of ranked elements based on the authenticity weights to generate the modified list of ranked elements.

16. The method of claim 13 wherein processing includes comparing the authenticity weights with a threshold value to generate the modified list of ranked elements.

17. The method of claim 16 wherein an element is removed from the list of ranked elements if the authenticity weight associated with the element does not meet the threshold value.

18. A computer-readable storage medium containing program instructions that, when executed by a computer system, cause the computer system to execute a method for ranking elements, the method comprising:
   receiving a search request including a search query;
   identifying a set of elements based on the search request,
   associating an authenticity weight to each of at least a subset of the elements, wherein the authenticity weight is indicative of the relative authority of an element wherein the authenticity metric value of a web element is assigned based on the number of links required to reach the web element from a seed web page having a pre-assigned authenticity weight, wherein the pre-assigned authenticity weight is assigned based on at least one of a previously determined authenticity metric value associated with the seed web page and a user-determined authenticity weight;
   processing the elements based on at least the authenticity weights;
   generating a list of ranked elements;
   transmitting the list to a client device.

19. The computer-readable storage medium of claim 18 wherein processing includes comparing each authenticity weight associated with each of the subset of the elements with a threshold value.

20. The computer-readable storage medium of claim 18 wherein processing includes generating a final ranking score for each element using the authenticity weight and other ranking parameters.

21. The computer-readable storage medium of claim 18 wherein an element is a search result.

22. The computer-readable storage medium of claim 18 wherein an element is an online advertisement.

* * * * *

UNITED STATES PATENT AND TRADEMARK OFFICE
CERTIFICATE OF CORRECTION

| | | |
|---|---|---|
| PATENT NO. | : 8,874,566 B2 | Page 1 of 1 |
| APPLICATION NO. | : 13/090101 | |
| DATED | : October 28, 2014 | |
| INVENTOR(S) | : Arnaud Robert | |

It is certified that error appears in the above-identified patent and that said Letters Patent is hereby corrected as shown below:

In the Claims,

At Column 15, Claim 8, line 16
  Please insert the word --data-- between "of" and "are" so the line reads:
    "elements in the set of data are advertisements."

Signed and Sealed this
Third Day of February, 2015

Michelle K. Lee
*Deputy Director of the United States Patent and Trademark Office*